(12) United States Patent
Hinds

(10) Patent No.: X6550
(45) Date of Patent: May 11, 1831

(54) BEER,COMPOSITION FOR MAKING

(76) Inventor: Stephen Hinds

Stephen Shriids

The Schedule referred to in these Letters Patent and making
part of the same containing a description in the words of the said
Stephen Shriids himself of his improvement in the compo
sition for the making of Beer.

To all to whom these Presents shall come
Be it known that I Stephen Shriids of Montrose in the Coun
ty of Susquehanna and State of Pennsylvania have in
vented a new and useful composition for the making of Beer
and that the following is a full and exact description of the
and process of compounding the same as invented by me
to wit. One pint of Molasses, one pint of new milk, &
one pint of common hop yeast are put into a six gallon
Keg which is then filled with air by means of a pump or
in any other mode most convenient until no more can
be compressed into the cask. it is then corked up and
let remain in that state for twenty four hours at the ex
piration of that time two gallons of water are mixed
with one quart of Molasses one ounce of ginger half an ounce
of alspice and half an ounce of the essence of Spruce, heated
boiling hot and put into the cask with three and a
half gallons of cold water again corked up and permit
ted to remain twenty four hours longer, [illegible] when the beer
[illegible] except two quarts of the sediment which should be left
in the cask the last described composition can be again
added to it and so on during the season. What
I claim as new and as my own invention in the above
described Manufacture and composition and for the
use of which I ask an exclusive privilege. is the com
position first above described, the proportions of the second
described composition and the whole process of making.
The whole of the Beer should be drawn without a vent, the car
bonic gas generated in the Beer renders one unnecessary.

Witnesses
B. T. Case
Daniel Post

Stephen Shriids 6896.

Patented, May 11. 1831.